United States Patent [19]

Haug

[11] Patent Number: 5,090,848
[45] Date of Patent: Feb. 25, 1992

[54] DEVICE FOR PRODUCING DRILLED HOLES WITH UNDERCUT

[75] Inventor: Willi Haug, Freudenstadt-Musbach, Fed. Rep. of Germany

[73] Assignee: fischerwerke Artur Fischer GmbH & Co. KG, Tumligen/Waldachtal, Fed. Rep. of Germany

[21] Appl. No.: 644,834

[22] Filed: Jan. 23, 1991

[30] Foreign Application Priority Data

Feb. 14, 1990 [DE] Fed. Rep. of Germany ....... 4004485

[51] Int. Cl.$^5$ .............................................. B23B 51/08
[52] U.S. Cl. ...................................... 408/27; 175/220; 408/26; 408/187; 409/191; 409/200
[58] Field of Search ................... 408/26, 27, 145, 147, 408/180, 187, 188, 194, 199; 175/220; 409/190, 191, 200

[56] References Cited

U.S. PATENT DOCUMENTS

| 4,962,820 | 10/1990 | Fischer | 408/72 R |
| 4,971,486 | 11/1990 | Rinklake et al. | 408/180 |

FOREIGN PATENT DOCUMENTS

| 0087085 | 8/1983 | European Pat. Off. | 408/187 |
| 240917 | 10/1987 | European Pat. Off. | |
| 8213668 | 8/1982 | Fed. Rep. of Germany | |
| 3106612 | 9/1982 | Fed. Rep. of Germany | |
| 8034491 | 11/1982 | Fed. Rep. of Germany | |
| 3122422 | 1/1983 | Fed. Rep. of Germany | 175/220 |
| 3207599 | 9/1983 | Fed. Rep. of Germany | 408/147 |
| 3332806 | 3/1985 | Fed. Rep. of Germany | |
| 3704491 | 8/1988 | Fed. Rep. of Germany | |

Primary Examiner—Steven C. Bishop
Attorney, Agent, or Firm—Michael J. Striker

[57] ABSTRACT

The device for producing an undercut drilled hole includes a drilling machine, a drilling tool having a drilling head widening conically towards its front end; an adaptor connecting the drilling tool and the drilling machine so that the drilling tool rotates with the drilling machine; a sleeve fixedly connected to the drilling machine and having a circumferentially collar, the adaptor extending through the sleeve with the drilling tool protruding from the sleeve; a fixed bearing bush structured to receive the sleeve so that the sleeve is pivotable in the bearing bush, the circumferential collar including a first axial end face arranged in linear contact with a wall of the bearing bush; and a resiliently deformable element, especially a rubber ring, arranged between an annular disc member connected to the bearing bush and a second axial end face of the circumferential collar opposite to the first axial end face for axially holding the circumferential collar. The circumferential collar and the sleeve are provided with surfaces and structured, so that the drilling machine and the sleeve are pivotable by hand so that the drilling tool is pivotable to make the undercut by a gyrating or wobbling motion. A stand with a holding device which is movable toward and away from the facing panel can be provided. The holding device holds the bearing bush with the drilling machine and tool mounted in it.

10 Claims, 2 Drawing Sheets

DEVICE FOR PRODUCING DRILLED HOLES WITH UNDERCUT

BACKGROUND OF THE INVENTION

The invention relates to a device for producing drilled holes with an undercut, especially in facing panels, comprising an adaptor having a drilling tool at the free end thereof, a bearing bush, and a sleeve having a circumferential collar and pivotally received within the bearing bush.

Devices to produce drilled holes with an undercut and having a bearing bush with a concave depression in which a drilling tool provided with a collar is supported and pivotally mounted are known. By pivoting-out the drilling tool while simultaneously moving it with a circular motion, an undercut in the region of the bottom of the drilled hole, into which an expansible fixing plug with an expansible sleeve can be inserted with a matching fit, is reamed out with lateral cutting edges of the drilling tool.

Such drilled holes with an undercut can also be made in facing panels or similar structures. However, in that case, the undercuts have to be made very precise, so that when inserting and expanding an expansible anchor, the expansion pressure that is generated is not too big. Too big an expansion pressure can result in a part of the facing panel breaking away. In order to produce a precise undercut, drilling tools which have a drilling head tipped with diamond chips are used. The known constructions for forming a pivot bearing bush are neither adequate for these impact-susceptible and shock-susceptible drilling tools, nor for the required accuracy of the undercut drilled holes in thin-walled facing panels.

SUMMARY OF THE INVENTION

The object of the invention is a device for making drilled holes with an undercut, especially in facing panels, which allows a drilling tool tipped with diamond chips to be used and a precise drilled hole matching the expansible fixing plug to be made.

The apparatus for producing a drilled hole with an undercut in a facing panel, comprises a drilling device including a drilling machine, a drilling tool having a drilling axis whose front end engagable with the facing panel is formed with a drilling head advantageously widening conically towards the front end for formation of the undercut; an adaptor connecting the drilling tool and the drilling machine so that, when the drilling machine is operated, the drilling machine rotates the drilling tool; a sleeve fixedly connected to the drilling machine and having a circumferential collar, the adaptor extending through the sleeve with the drilling tool protruding from the sleeve; and a bearing bush for pivotally receiving the sleeve so that the sleeve is pivotable in the bearing bush. The circumferential collar includes a first axial end face arranged in linear contact with a wall of the bearing bush. A resiliently deformable element is arranged between an annular disc member connected to the bearing bush and a second axial end face of the circumferential collar opposite to the first axial end face for axially holding the circumferential collar in the bearing bush. The resiliently deformable element projects beyond the second axial end face of the circumferential collar. The circumferential collar and the sleeve are provided with surfaces and are structured, so that the drilling machine and the sleeve are pivotable by hand so that the drilling tool can be swung out to make the undercut with a gyrating motion. The apparatus also has a support stand having a clamping arrangement for securing the facing panel; holding means displaceably mounted on the support stand which hold the bearing bush fixed therein; means for moving the holding means and the drilling device held therein along a support stand including a lever for manual operation of the holding means so that, when the lever is moved in one direction, the holding means with the drilling machine and drilling tool can be moved downwardly so that the drilling tool engages the facing panel for formation of a cylindrical hole to be undercut.

The object of the invention is achieved by connecting the sleeve fixedly with the drilling machine, mounting the collar in such a manner that one end face thereof has a linear contact with the sleeve wall, and providing at the other end of the collar, a resiliently deformable element that projects beyond an end face of the collar and clamps it axially in the bearing bush. Because the collar arranged on the sleeve is clampled axially with its end face lying linearly at the base of the bearing bush and with the resiliently deformable element arranged at its other end face, when the cylindrical drilled hole is made, there is a restricted guidance which precludes the drilled hole from running offcenter. Once the cylindrical drilled hole has been made, the sleeve joined to the drilling machine is swung out. As this happens, the resilient element is deformed on the swung-out side, while on the other side, the axial clamping is maintained. This insures that, even when the undercut is made, an exact restricted guidance is achieved, which results in a precisely defined undercut. Furthermore, impacts and jerky movements during the pivoting-out are avoided, resulting in a long life of the tool. A circumferential undercut is achieved when, in the swung-out state, at least one complete circular motion back to the starting point is performed.

A suitable resiliently deformable element is either a rubber ring or a pressure spring having flat bearing faces at each end which is held in an annular groove made in the end face of the collar. When using a pressure spring, it is advisable also to provide an annular groove in the base of the bearing bush, in order to achieve lateral guidance of the adaptor by the pressure spring. When using a rubber ring, the lateral guidance is achieved in that at its outer surface, the collar is guided circumferentially in line contact with the bearing bush. The pivoting of the adaptor is not hampered by the linear contact.

One possibility for restricting the pivotal angle can be achieved by providing in the axial bore of the bearing bush towards the outer surface of the sleeve, an annular gap restricting the pivotal angle are, for example, locating the end face of the collar carrying the resiliently deformable element on the base of the bearing bush or, when using a pressure spring, causing the coils of the spring to lie adjacent one another on the swung-out side.

For holding the device, the bearing bush can be joined to a support stand having a clamping arrangement for the facing panel, and can be moved by a lever towards the facing panel to produce the drilled hole.

The invention both as to its construction so to its mode of operation, together with additional objects and advantages thereof, will be best understood from the following detailed description of the preferred embodiments when read with reference to the accompanying drawing.

DETAILED DESCRIPTION OF THE PREFERRED EMBODIMENTS

Figure 1:
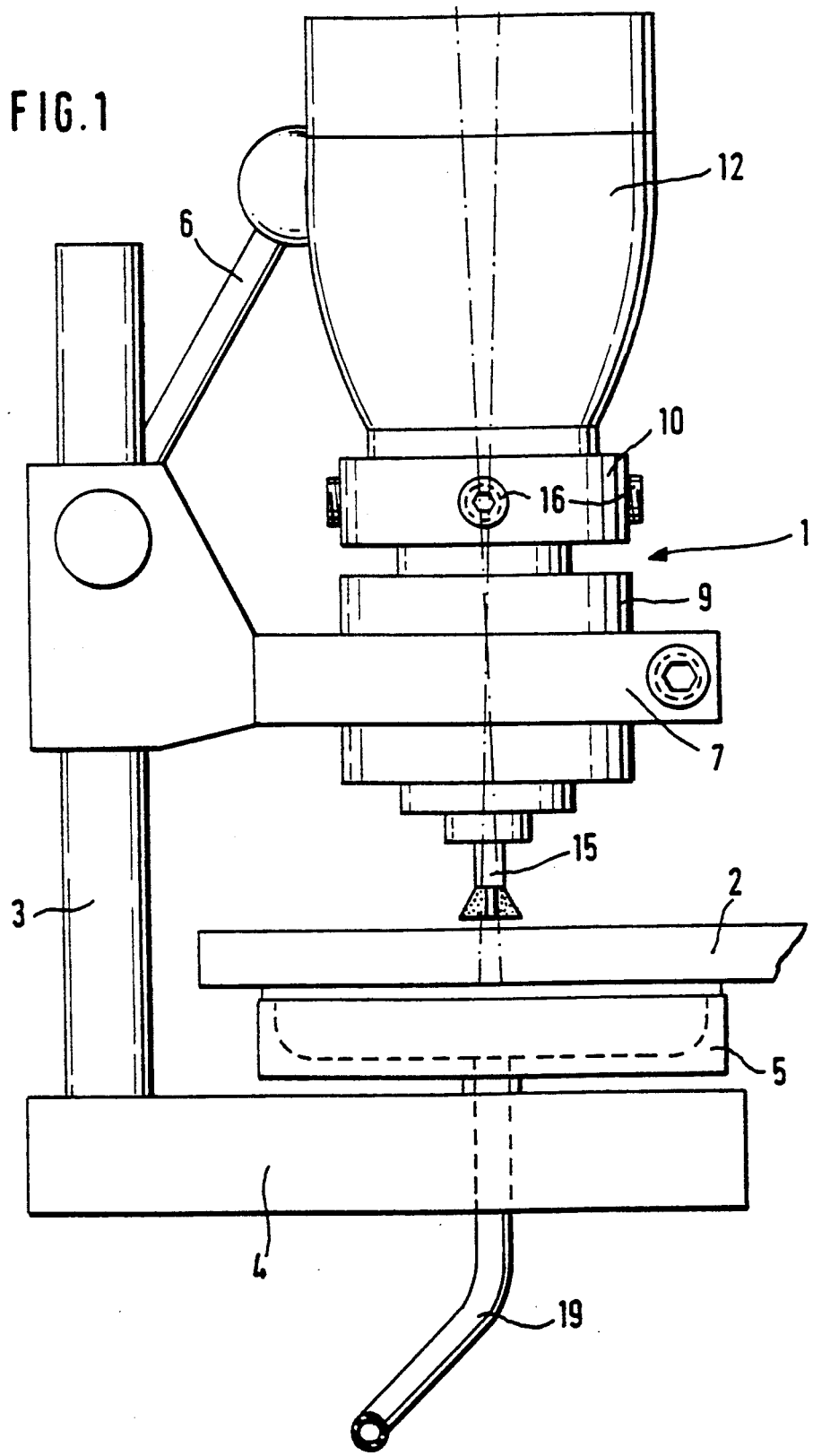
FIG. 1 shows an elevational side view of the device according to the invention with support stand and clamping arrangement for the facing panel.

FIG. 1 shows a device 1 for producing drilled holes with an undercut in facing panels 2. The device 1 is connected to a support stand 3. The support stand 3 has at one end, on its base plate 4, a clamping arrangement 5 for the facing panel 2, and at its other end has a lever 6 with which a holding device 7 that supports the device 1 and is connected with the support stand 3, can be moved up and down. To clamp the device 1 to the holding device 7, the latter has a split receiving bore 8 in which the bearing bush 9 of the device 1 is clamped by closing up the receiving bore 8 of the holding device 7. A circumferential collar 11 arranged on the sleeve 10 of the drilling device 1, is received within the bearing bush 9. As the holding device 7 is moved up and down, the drilling device is moved with it.

An adaptor 22 connected to the drilling machine 12 transfers torque to a drilling tool 15. The adaptor 22 extends through the sleeve 10 of the drilling device. The tool 15 is mounted at the end of the adaptor 22 remote from the drilling machine 12. The drilling tool 15 serves to produce a drilled hole 13 with an undercut 14. The sleeve 10 is rigidly connected with screws 16 to the housing of the drilling machine 12, so that, as the drilling machine 12 is swung or pivoted out, the sleeve 10 together with the drilling tool 15 are also pivoted out. Favorable lever ratios provide for appropriate swinging of the drilling machine 12. By a gyratory motion describing at least a complete circle, the drill head 18 of the drilling machine 12 also describes a circle, which is larger than the drill head diameter because of the drilling axis 17 being swung out. By this means, once the cylindrical drilled hole 13 has been formed in the facing panel 2 with the drilling axis positioned vertically, the undercut 14 is provided at the bottom of the drilled hole 13 by pivoting the drilling axis 17 and simultaneously performing a gyratory motion. Both the pivoting of the drilling axis 17 and the gyratory motion of the drilling tool result from swinging or pivoting the drilling machine 12 by hand.

When the drilled hole 13 is formed, the facing panel 2 is held by the vacuum clamping device 5. The facing panel 2 is placed on the clamping table and the suction pump (not illustrated) connected by a hose 19, is switched on to produce the vacuum.

To make the drilled hole 13, a drilling tool 15 is used. The drilling tool 15 is joined by a coupling member 21 having an internal thread 20 to the adaptor 22 that can be clamped in the drilling machine 12. A drilling head 18 is arranged at the end of the reduced shank of the drilling tool 15. The drilling head 18 is tipped with diamond chips and widens conically towards its front end. To improve the cutting efficiency and guidance of the drilling tool, when forming the cylindrical part of the drilled hole, the drilling head 18 has at least one slot 23 extending from its outer edge and beyond the axis center.

Figure 2:
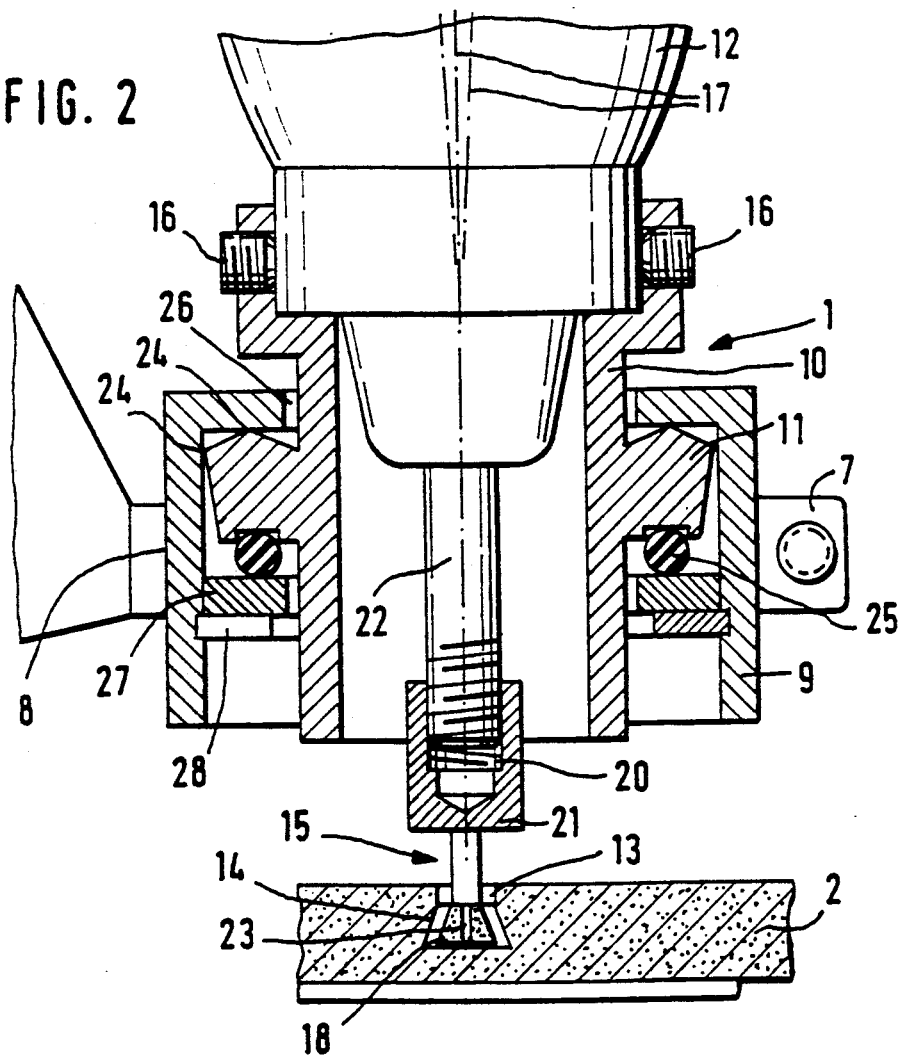
FIG. 2 shows a cross-sectional view of the pivot bearing of the device shown in FIG. 1.

FIG. 2 shows an embodiment of the pivot bearing which allows an exact and controlled pivoting-out of the device 1 except for the fixed bearing bush 9, in which the other elements of the device 1 are pivotally mounted. The circumferential collar 11 arranged on the sleeve 10 has at one axial end face, and preferably also on its outer surface, flattened areas to provide for approximately linear engagement or a line contact 24 in the bearing bush 9. On the other axial end face of the collar 11, there is arranged a resiliently deformable rubber ring 25 projecting beyond the end face of the collar. The ring 25 clamps the collar 11 axially in the bearing bush 9. As the sleeve 10 is swung out by pivoting the drilling machine by hand, the rubber ring 25 is axially compressed on the side the drilling machine is pivoted out so that the sleeve 10 takes up an inclined position. In this swung-out position, the drilling machine 12 is moved by hand in a gyratory movement with the drilling tool 15 and sleeve 10 at least once completely as the drilling axis 17 makes a complete revolution. The deformation of the rubber ring 25 is likewise moving around the midway point of the axis corresponding to the position of the sleeve 10. The linear engagement or line contact 24 of the collar 11 in the bearing bush 9 and the nondeformability of the collar 11 insures a percise and accurately repeatable swinging-out and gyratory motion, which results in exactly identical undercuts 14 in the drilled holes 13. The amount of deformation of the rubber ring 25 is limited either by the end face of the collar 11 abutting against the base of the bearing bush 9, or by a corresponding annular gap 26 between the axial bore of the base of the bearing bush 9 and the wall of the sleeve 10, which strikes against the wall of the axial bore. For simple assembly of the sleeve 10 with collar 11 and the bearing bush 9, a base element of the bearing bush 9 is formed by an annular disc 27 which is held in position with a securing ring 28 connected to the bearing bush.

The sleeve 10, and thereby the drilling tool 15 and drilling machine 12, are biased with respect to the bearing bush 9 by the resilient rubber ring 25 in such a manner that the drilling axis 17 lies at right angles to the facing panel 2. In this unpivoted position, the device 1 is pressed against the rear side of the clamped facing panel 2, and in the panel, a cylindrical bore 13 is made corresponding to the largest diameter of the drilling head 18. Once the required drilled hole depth has been reached, which is adjustable, for example, by stops on the support stand 3, the sleeve 10, with the drilling machine 12 running, is swung out, and at least one gyratory movement is performed. As this takes place, the undercut 14 is formed at the bottom of the drilled hole by the drilling tool 15. When using a drilling tool tipped with diamond chips it is advisable to wash out the drilled hole with water during the drilling operation.

Figure 3:
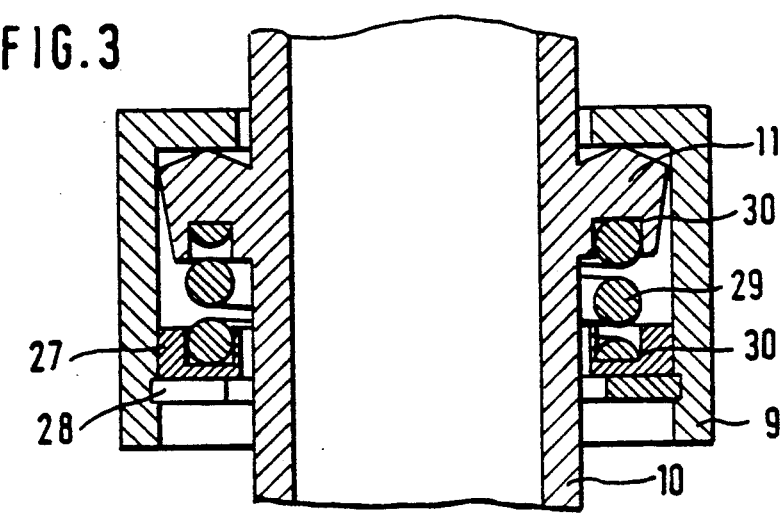
FIG. 3 shows a partially cross-sectional view of a further embodiment of the pivot bearing of the device according to the invention.

FIG. 3 shows another embodiment of the device 1 of the invention or the pivot bearing. In this embodiment, a pressure spring 29 is used as the resiliently deformable element. The spring has its opposite ends located in corresponding annular grooves 30 in the end face of the collar and an annular disc 27, respectively. The resilience in this embodiment is provided by compressing the spring 29 on the swung-out side of the sleeve 10. In this embodiment, lateral guidance is not needed since it can be achieved by the lateral stability of the pressure spring 29. Using a pressure spring made of spring wire provides for a long service life of the bearing.

While the invention has been illustrated and described as embodied in a device for producing drilled holes with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for producing a drilled hole with an undercut in a facing panel, said device including a drilling machine, a drilling tool having a drilling axis and a front end engagable with the facing panel, said drilling tool being formed with a drilling head at the front end; an adaptor connecting the drilling tool and the drilling machine so that, when said drilling machine is operated, said drilling machine applies a torque to said drilling tool; a sleeve fixedly connected to the drilling machine and having a circumferential collar, said adaptor extending through said sleeve with said drilling tool protruding from the sleeve; a bearing bush for pivotally receiving said sleeve so that said sleeve is pivotable in said bearing bush, said circumferential collar including a first axial end face arranged in linear contact with a wall of the bearing bush; and a resiliently deformable element arranged between an annular disc member connected to said bearing bush and a second axial end face of said circumferential collar opposite to said first axial end face for axially holding said circumferential collar in said bearing bush, said resiliently deformable element projecting beyond said second axial end face of said circumferential collar, said circumferential collar and said sleeve being provided with surfaces and being structured, so that said drilling machine and said sleeve are pivotable by hand so that the drilling tool can be swung out to make the undercut with a gyrating motion.

2. A device as set forth in claim 1, wherein said resiliently deformable element is a rubber ring.

3. A device as set forth in claim 1, wherein said resiliently deformable element is a pressure spring having flat bearing faces at opposite ends thereof.

4. A device as set forth in claim 1, wherein said circumferential collar has a circumferential outer surface forming a circumferential line contact with said bearing bush.

5. A device as set forth in claim 1, wherein said bearing bush has an inner annular surface surrounding said sleeve and forming a gap therewith, said inner annular surface limiting pivotal movement of said sleeve.

6. An apparatus for producing a drilled hole with an undercut in a facing panel, comprising a drilling device including a drilling machine, a drilling tool having a drilling axis and a front end engagable with the facing panel and being formed with a drilling head; an adaptor connecting the drilling tool and the drilling machine so that, when said drilling machine is operated, said drilling machine applies a torque to said drilling tool; a sleeve fixedly connected to the drilling machine and having a circumferential collar, said adaptor extending through said sleeve with said drilling tool protruding through said sleeve; a bearing bush for pivotally receiving said sleeve so that said sleeve is pivotable in said bearing bush, said circumferential collar including a first axial end face arranged in linear contact with a wall of the bearing bush; a resiliently deformable element arranged between an annular disc member connected to said bearing bush and a second axial end face of said circumferential collar opposite to said first axial end face for axially holding said circumferential collar in said bearing bush, said resiliently deformable element projecting beyond said second axial end face of said circumferential collar, said circumferential collar and said sleeve being provided with surfaces and being structured, so that said drilling machine and said sleeve are pivotable by hand so that the drilling tool can be swung out to make the undercut with a gyrating motion; a support stand having a clamping arrangement for securing the facing panel; holding means displaceably mounted on the support stand, said bearing bush being held fixed in said holding means; and means for moving said holding means and said drilling device held therein along said support stand, said means for moving said holding means including a lever for manual operation of said holding means so that, when said lever is moved in one direction, said holding means with said drilling machine and drilling tool can be moved downwardly so that said drilling tool engages said facing panel for formation of a cylindrical hole to be undercut.

7. An apparatus as set forth in claim 6, wherein said drilling head is tipped with diamond chips and widens conically towards the front end, said drilling head being provided with at least one slot starting from an outer edge thereof and extending beyond a midway point of the drilling axis.

8. An apparatus as set forth in claim 6, wherein said resiliently deformable element comprises a rubber ring.

9. An apparatus as set forth in claim 6, wherein said resiliently deformable element is a pressure spring having flat bearing faces at opposite ends thereof.

10. An apparatus as set forth in claim 6, wherein said circumferential collar is provided with a circumferential outer surface having a circumferential line contact with said bearing bush.

* * * * *